A. GÜNZEL.
LINK CHAIN.
APPLICATION FILED MAR. 4, 1911.
1,020,197.
Patented Mar. 12, 1912.
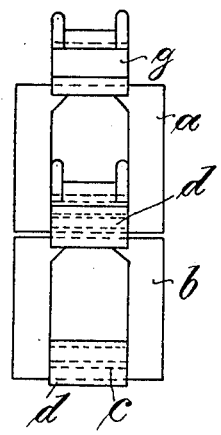
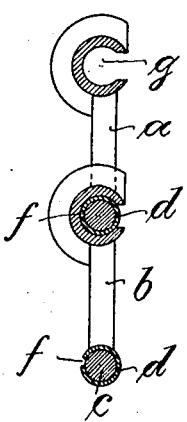
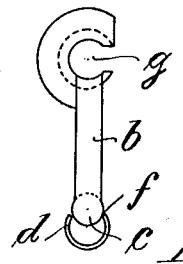
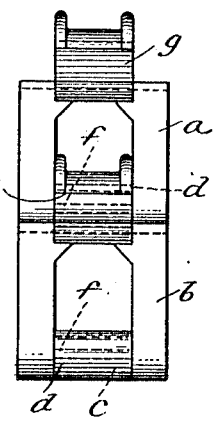
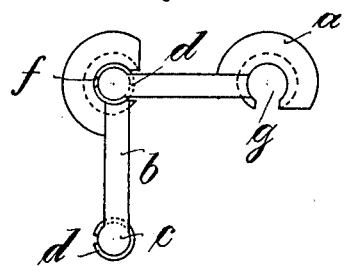
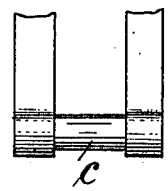
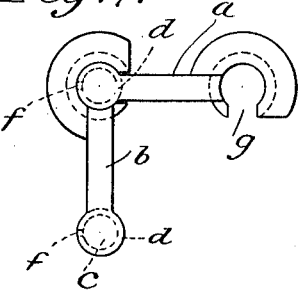
Witnesses:
Corinne Myers.
Vera Paulson.
Inventor:
Alfred Günzel
by L. K. Böhm,
Attorney

UNITED STATES PATENT OFFICE.

ALFRED GÜNZEL, OF ROCHLITZ, GERMANY, ASSIGNOR TO ARNO GÜNZEL, OF ALTENBURG, GERMANY.

LINK CHAIN.

1,020,197.   Specification of Letters Patent.   Patented Mar. 12, 1912.

Application filed March 4, 1911. Serial No. 612,182.

*To all whom it may concern:*

Be it known that I, ALFRED GÜNZEL, a subject of the King of Saxony, and resident of Rochlitz, in the Kingdom of Saxony, German Empire, have invented certain new and useful Improvements in Link Chains, of which the following is a specification.

This invention relates to link chains of the type in which the links can be taken apart and which are applicable as driving chains or hauling chains for all purposes and particularly for manure distributing machines, the links of the chain having joint bolts which can be inserted in the direction of their axis into the hooks of the adjacent links. These link chains have the advantage that they can be readily taken apart, but on the other hand they have the disadvantage that dust, dirt and the like can penetrate through the opening of the hooks between the joint bolts and the hooks, so that very great wear takes place at the joints.

In order to obviate the foregoing deficiencies, according to the present invention, the hooks do not engage directly with the joint bolts but a bush is inserted between the two parts. This bush is rotatable on the joint bolt and fits into the hook when the hook is slipped over the joint bolt. By means of this bush the opening of the hook is closed so that dust, dirt and the like cannot penetrate between the joint bolt and its bearing surface.

The bush is preferably split and constructed of springy material, so that it may be readily fitted over the joint bolt and when inserted in position in the hook, grips against the inner surface of the hook.

In order that the side members of each adjacent pair of links may fit closer together and thus prevent the liability of dirt entering between the side members and choking the same, the side members of each link may be extended beyond the joint bolt a distance equal to the thickness of the bush.

In order that the invention may be more clearly understood reference is made to the accompanying drawings, which show by a way of example the application of our invention to one form of link chain.

Figure 1 is a view showing two links connected together, and Fig. 2 is a section through the same. Fig. 3 is a side view of one of the links showing the bush at the moment of fitting over the joint bolt. Fig. 4 shows the position assumed when the links are being joined together. Fig. 5 is a detail view showing the setting back of the joint bolt in the link. Figs. 6 and 7 are views corresponding to Figs. 1 and 4 respectively but showing links constructed in accordance with Fig. 5.

The joint bolts $c$ of the links $a$ and $b$ are constructed of such a diameter that they can loosely move in the bushes $d$. The bush $d$ is provided with a slit $f$, (see Figs. 2, 3 and 4) so that the bush may be readily fitted upon or removed from the joint bolt $c$. As shown at Fig. 4, the links $a$ and $b$ at the moment of joining are brought together in such a manner that the slit $f$ of the bush $d$ is directed toward the crown of the recess or hook $g$ in the link $b$, and that the split bush $d$ is securely held in the recess owing to its springy nature. The joint bolt $c$ can then rotate in the bearing formed by the bush $d$ and is protected against penetration of dirt or the like by means of the bush $d$, as may be readily seen at Fig. 2, the bush $d$ closing the entrance to the recess $g$.

Lubrication of the joints is unnecessary as the bush $d$ offers a good bearing for the joint bolt $c$, and may be of rustless material, so that the joint cannot become rusty, and is always protected against the penetration of dirt and as the bolt can easily move in the bearing in the manner necessary.

Figs. 5, 6 and 7 show how the side members of each link may be extended beyond the joint bolt $c$ a distance equal to the thickness of the bush $d$ so that the side members of adjacent links may fit closer together.

I claim:—

1. A link chain comprising, in combination, a series of links each having a transverse bolt at one end and a transverse segmental recess at the other end, the bolt of one link being capable of axial insertion in and removal from the recess of the adjacent link, the side members of the one link thereupon sliding through the transverse lateral opening of the recess in the adjacent link, and a bush surrounding the transverse bolt of the one link and fitting in the recess of the adjacent link so as to close the transverse lateral opening of said recess.

2. A link chain comprising, in combination, a series of links, each having a transverse bolt at one end and a transverse segmental recess at the other end, the bolt of one link being capable of axial insertion in and removal from the recess of the adjacent link, the side members of the one link thereupon sliding through the transverse lateral opening of the recess in the adjacent link, and a split bush surrounding the transverse bolt of the one link and fitting in the recess of the adjacent link so as to close the transverse lateral opening of said recess, said split bush forming a bearing for the transverse bolt.

3. A link chain comprising, in combination, a series of links, each having a transverse bolt at one end and a transverse segmental recess at the other end, the bolt of one link being capable of axial insertion in and removal from the recess of the adjacent link, the side members of the one link thereupon sliding through the transverse lateral opening of the recess in the adjacent link, and a split bush of springy metal surrounding the transverse bolt of the one link and fitting in the recess of the adjacent link so as to close the transverse lateral opening of said recess, said split bush forming a bearing for the transverse bolt and being held by friction in said recess.

4. A link chain comprising, in combination, a series of links, each having a transverse bolt at one end and a transverse segmental recess at the other end, the bolt of one link being capable of axial insertion in and removal from the recess of the adjacent link, the side members of the one link thereupon sliding through the transverse lateral opening of the recess in the adjacent link, and a bush surrounding the transverse bolt of the one link and fitting in the recess of the adjacent link so as to close the transverse lateral opening of said recess, the side members of each link extending a short distance beyond the transverse bolt carried thereby so that the side members of adjacent links fit closer together.

In witness whereof I have hereunto set my hand in the presence of two witnesses.

ALFRED GÜNZEL.

Witnesses:
  ALBERT R. MORAWETZ,
  RUDOLPH FRICKE.

---

Copies of this patent may be obtained for five cents each, by addressing the "Commissioner of Patents, Washington, D. C."